United States Patent [19]
Wallace

[11] Patent Number: 5,911,024
[45] Date of Patent: Jun. 8, 1999

[54] FIBER OPTIC DISPLAY SCREEN ASSEMBLY AND METHOD FOR MAKING A FIBER OPTIC SCREEN

[76] Inventor: Troy B. Wallace, P.O. Box 438, Georgetown, Me. 04548

[21] Appl. No.: 08/834,994

[22] Filed: Apr. 7, 1997

[51] Int. Cl.[6] ........................................................ G02B 6/04
[52] U.S. Cl. .............................. 385/120; 385/115; 385/31
[58] Field of Search ..................................... 385/120, 115, 385/116, 119, 121, 31, 33

[56] References Cited

U.S. PATENT DOCUMENTS

| | | | |
|---|---|---|---|
| 2,992,516 | 7/1961 | Norton | 385/120 |
| 3,043,910 | 7/1962 | Hicks | 385/120 |
| 3,226,589 | 12/1965 | Woodcock . | |
| 3,826,944 | 7/1974 | Cooper | 385/120 |
| 4,739,172 | 4/1988 | Obata et al. | 385/120 |
| 5,127,080 | 6/1992 | Duggan | 385/120 |
| 5,543,870 | 8/1996 | Blanchard . | |
| 5,642,449 | 6/1997 | Phillips | 385/33 |

*Primary Examiner*—Phan T. H. Palmer
*Attorney, Agent, or Firm*—Terrance L. Siemens

[57] ABSTRACT

The present invention features a fiber optic display screen constructed from a plurality of short optical fibers. Groups of the short optical fibers form optical couplers, each optical coupler receiving a single input fiber. Each coupling fiber is attached to the face of a cathode ray tube such that an image appearing at the face of the cathode ray tube is conducted via a plurality of input fibers to the optical couplers whereby an enlarged image is displayed remotely from the cathode ray tube. A method for assembling the fiber optic display screen of the invention is also presented.

17 Claims, 4 Drawing Sheets

FIBER OPTIC DISPLAY SCREEN ASSEMBLY AND METHOD FOR MAKING A FIBER OPTIC SCREEN

This application is related to my co-pending application, Ser. No. 08/792,663 filed Jan. 31, 1997 which is incorporated herein by reference.

FIELD OF THE INVENTION

The present invention relates to a display screen assembly comprising a plurality of optical fibers, and more particularly, to a screen assembly with pixels enlarged by means of fiber optic couplers. The input fibers of the optical couplers may be attached to and driven by the face of a cathode ray tube (CRT) wherein the screen assembly of the invention functions as a large-screen television or the like.

BACKGROUND OF THE INVENTION

DISCUSSION OF THE PRIOR ART

Many attempts have been made to develop large-screen displays for use in television receivers or the like. A variety of different techniques have been employed heretofore, each with its unique problems. Projection TV systems employing three separate, high-intensity CRTs, one each for red, blue and green, in conjunction with a projection lens system have been popular. These systems have suffered from high cost and low light intensity which has required special projection screens and viewing under very low ambient light conditions. In addition, the need to converge three separate CRT images has often resulted in a poorly converged, fuzzy screen image. CRT life has also been limited because the extremely high intensities required for image projection require high beam currents.

Another method for providing a large-screen display has been to use a conventional, single-CRT television receiver and by means of mirror and/or lens systems, to rear-screen project an enlarged image onto a screen forming a part of the television receiver cabinet. While this type of system has overcome the convergence problems inherent in the three-CRT projection systems, they are not without their problems. Image intensity is still relatively low and the costs have heretofore been high. Large cabinets are generally required to house the CRT and the required lens/mirror system.

Flat panel displays including tiled flat panel displays are now entering the marketplace and promise to provide an excellent choice for large-screen displays in the future. At this time, flat-panel displays are still prohibitively expensive for all but the highest end applications.

U.S. Pat. No. 3,043,910, for FIBER OPTICAL IMAGE TRANSFER DEVICE; issued Jul. 10, 1962 to J. W. Hicks, Jr. teaches the use of a plurality of optical fibers for the transfer of an image from a relatively small cathode ray tube (CRT) to a much larger viewing surface. Hicks also teaches methods of manufacturing fiber optical devices for performing the image transfer and enlargement functions. In contradistinction, the fiber optic display screen of the present invention utilizes the unique fiber optical coupling device, the subject of my above-identified copending patent application. This unique coupling device provides greater uniformity of intensity over the viewing area than is possible with the Hicks or similar systems.

The use of fiber optic device attached to or forming a part of a CRT is known. U.S. Pat. No. 3,826,944 for CATHODE RAY TUBE WITH INORGANIC PHOSPHOR AND FIBER FACEPLATE; issued Jul. 30, 1974 to Kenneth Cooper teaches such a system. The Cooper device utilizes an essentially conventional CRT having a phosphor which radiates in the ultraviolet (UV) spectrum on the inner surface of a fiber optic window. On the outer surface of the fiber optic window is placed a UV-transmissive, visible-absorbing filter layer. An organic phosphor emitting light in the visible range upon excitation by UV energy is disposed on the filter layer. Finally, a visible light transmitting, UV-blocking filter is disposed over the phosphor layer. This arrangement results in a high-contrast CRT which produces an image suitable for viewing in high ambient light conditions. The particular construction causes ambient light striking the CRT face to be absorbed without degrading the image. The system of the present invention does not use a fiber optic array as part of a face plate. In addition, relatively long fibers are extended from the face plate of a CRT to a remote viewing screen region. Finally, the inventive system does not rely on UV energy-excited phosphor for the production of visible light.

U.S. Pat. No. 4,739,172 for FIBER OPTIC PHOSPHOR SCREEN AND A METHOD OF MANUFACTURING THE SAME; issued Apr. 19, 1988 to Yoshiharu Obata, et al. teaches the coating of a light-emitting phosphor on one side of a fiber optic plate. The plate consists of a large number of bundled, single, clad optical fibers. A depression in the end of the fiber facing the phosphor layer of the screen is removed to leave a depression which prevents a direct contact between the core region of the optical fiber and the phosphor. The Yoshiharu, et al. apparatus is designed for inclusion within an evacuated envelope of an X-ray intensifier. Consequently, the optical fibers employed are a few millimeters in length. The phosphor used on the Yoshiharu, et al. System is also designed to emit visible light when excited by electromagnetic energy in the X-ray band. In contradistinction, the system of the present invention may be external to a CRT, X-ray image enhancer, or the like. The optical fibers used in the invention may be several meters in length. Also, the phosphor is designed to be excited by electromagnetic energy in the X-ray band having a wavelength of between 300 nanometer (nM) and 800 nM. In the preferred embodiment the chosen prosper is an inorganic, non-crystalline cathodoluminescent material doped with impurities ranging from 1 part in 100,000 to 1 part in 100 to produce red, green, or blue visible light emission.

Another use of fiber optics in conjunction with a CRT face plat is taught in U.S. Pat. No. 5,127,080 for PSEUDO-INTAGILIATED FIBER OPTIC PHOSPHOR SCREEN AND METHOD; issued Jun. 30, 1992 to Daniel D. Duggan, Sr. The Duggan system provides both a high-resolution image and high light output by using phosphor islands bonded to the ends of individual optical fibers of a fiber optic array. Again, unlike the system of the present invention, the optical fibers employed are a few millimeters in length. The Duggan system does not teach the enlargement of the image through the use of the unique optical coupler used in the system of the instant invention.

U.S. Pat. No. 5,453,879 for REAR PROJECTION SCREEN WITH HIGH OFF-AXIS SUNLIGHT REJECTION; issued Aug. 6, 1996 to Randall D. Blanchard teaches the use of an array of optical fibers as a face plate in a rear-screen image projection apparatus. The use of the optical fiber array provides a high degree of blocking of any incident light impinging of the front surface of the projection screen. There is no use of the unique optical coupler employed as in the system of the present invention. The optical fiber array is also thin relative to the length of the optical fiber array of the present invention, and serves an entirely different purpose.

It is therefore an object of the present invention to provide a fiber optic display screen separable from a CRT thus allowing versatility in placing the CRT relative to the display screen.

It is another object of the invention to enlarge the image from the CRT screen.

It is yet another object of the invention to fabricate the inventive optical display screen to utilize the unique optical coupling devices as described in my above-identified, co-pending patent application.

It is a further object of the invention to provide a simple and inexpensive method for assembling the optical display screen of the present invention.

SUMMARY OF THE INVENTION

The present invention features a fiber optic display screen formed from a matrix of short optical fibers bonded together. Groups of optical fibers are concave ground at their rear surfaces to receive a convex terminating portion of a single input optical fiber. These input optical fibers are attached to or form a part of the face plate of an image-producing CRT such that the CRT image is carrier by the input optical fibers to the display screen. The light from each input optical fiber is transferred to multiple fibers within the optical coupler whereby the CRT image is enlarged. The optical coupler so constructed allows for great uniformity in the amount of radiant energy transferred from the input fiber into each of the output fibers of the array. Multiple optical couplers, each containing typically seven optical fibers, thereby enlarge image from the CRT screen.

BRIEF DESCRIPTION OF THE DRAWINGS

A complete understanding of the present invention may be obtained by reference to the accompanying drawings, when taken in conjunction with the detail description thereof and in which.

DESCRIPTION OF THE PREFERRED EMBODIMENT

The present invention relates to a fiber optic display screen assembly comprising a plurality of short optical fibers, and more particularly, to a screen assembly with pixels enlarged by means of unique fiber optic couplers. The input fibers of the optical couplers may be attached to and driven by the face of a cathode ray tube (CRT) wherein the screen assembly of the invention functions as a large-screen television or the like display screen.

Figure 1:
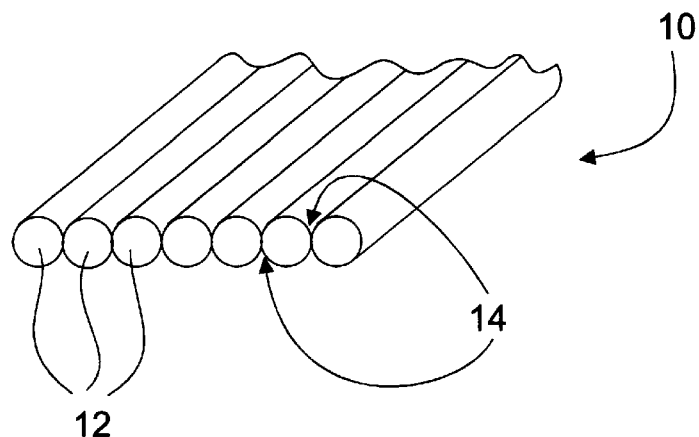
FIG. 1 is a perspective view of the several optical fibers arranged in an optical flat bar assembly.

Referring first to FIG. 1, there is shown a perspective view of an array 10 of seven optical fibers 12. Fibers 12 are laid side-by-side abutting one another tangentially to form an optical flatbar assembly. The optical fibers 12 employed have a diameter of approximately 0.43 mm. Other diameter fibers may be used as operating circumstances dictate. Optical fibers 12 are cemented one to another at tangential contact points using a thin layer of cement 14. A cement found suitable for this application is clear, fast cure epoxy manufactured by 3M as sold as catalog number DP105. Techniques for bonding fibers are well know in the art. It should be obvious that any number of optical fibers may be built into an optical flatbar assembly. Typically, the width of the optical flatbar assembly will be the same as the desired width of the fiber optic display screen constructed therefrom.

Figure 2:
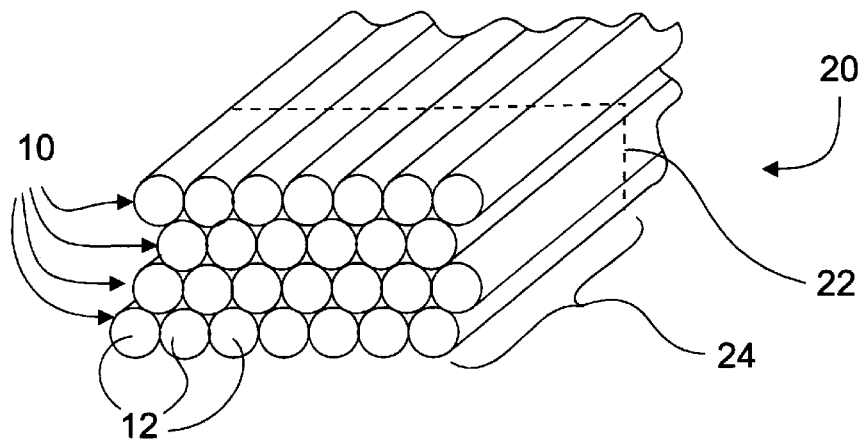
FIG. 2 is a perspective side of four stacked optical flat bar assemblies forming a fiber optical laminate.

FIG. 2 is a perspective view of four optical flatbar assemblies 10 stacked vertically to form a fiber optic laminate, reference number 20. The flatbar assemblies 10 are also cemented one to another at points of contact using materials and techniques well known in the art. Fiber optic laminate 20 may be constructed in any required size, the dimension of the laminate will be the size of the screen assembly formed therefrom. Note that the dimensions are chosen so that each fiber may be grouped into typically a seven-fiber array to facilitate the forming of optical couplers. Other optical couple configurations having other numbers of optical fibers may, of course, be constructed. After laminate 20 has been laid up to the desired dimensions, it is cut cross-sectionally (parallel to its face) along line 22. The thickness of cut laminate 24 will generally be approximately 0.375 inch, however other thicknesses may be chosen to meet a particular operating constraint or environment. Both faces of cut laminate 24 are ground smooth using techniques and materials also well known in the art.

Figure 3:
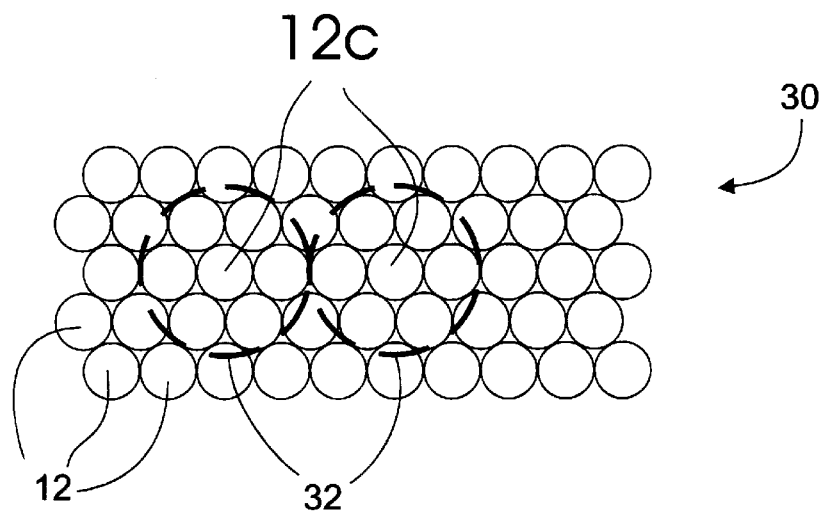
FIG. 3 is an end plan view of the stacked flat bar assemblies as shown in FIG. 2 with groups of optical fibers forming optical couplers identified.

Referring now to FIG. 3, there is shown an end view of cut laminate 24, reference number 30. Two typical groups of seven optical fibers 12 are identified by circles 32. In each group 32, a central optical fiber 12c is surrounded by six other optical fibers. The groups 32 of fibers 12, 12c will be formed into optical couplers as described in detail in my above-identified, copending patent application. Note that the number of optical fibers in laminate 24 has been chosen such that each included optical fiber forms a part of a group 32.

Figure 4:
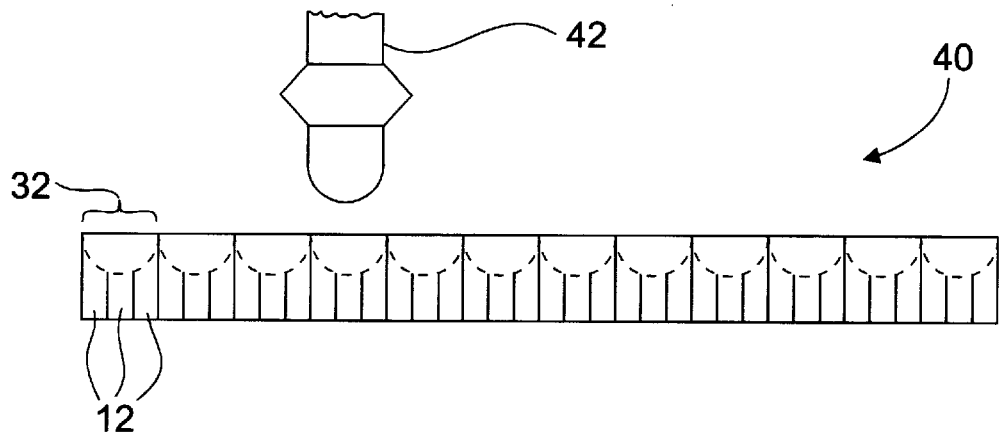
FIG. 4 is a side, cross-sectional view of the stacked flat bar assemblies ground to receive the convex portion of an optical fiber to form an optical coupler.

Referring now to FIG. 4, there is shown a cross-sectional view of cut laminate 24. Each group 32 of fibers 12 is ground to a concave profile, typically by a robotic grinder 42. The concave depressions in groups 32 are adapted to receive the concave portion of an optical fiber to form an optical couple as described in detail in my copending application. Each group 32 in cut laminate 24 is ground in a similar fashion. Optical laminate 24 is now prepared to receive input fibers.

Figure 5:
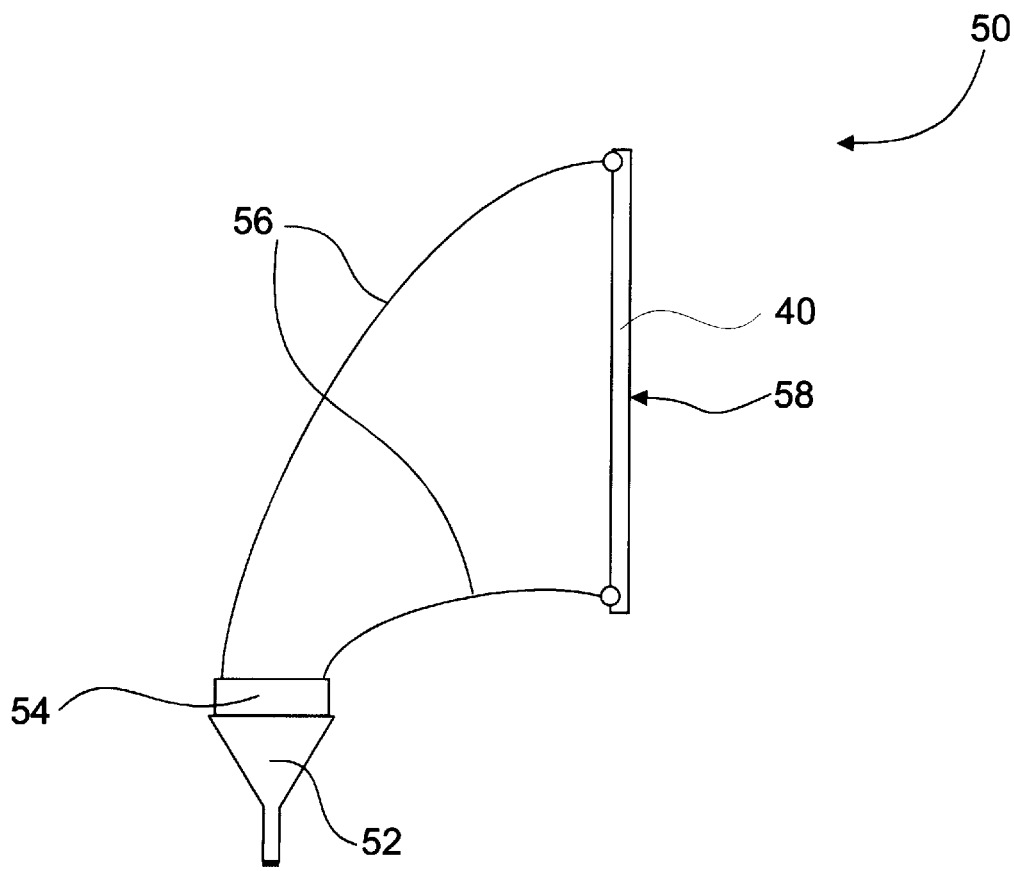
FIG. 5 is a schematic representation of the fiber optic display screen system.

Referring now to FIG. 5, there is shown a schematic representation of the CRT to screen coupling method of the present invention, shown generally at reference number 50. A CRT 52, either conventional or specially constructed as will be described in detail hereinbelow, has a plurality of optical fibers 56 attached to its face 54. Each optical fiber 56 has a spherical end portion adapted to mate with the concave depression previously ground into the rear surface of fiber optical laminate 40. The front surface of fiber optic laminate 40 forms a viewing screen 58. It should be obvious that optical fibers the arrangement of optical fibers 56 must be systematic, i.e. the fiber connect to the upper left corner of the face of CRT 52 must become the upper left fiber connected to screen 58.

Figure 6:
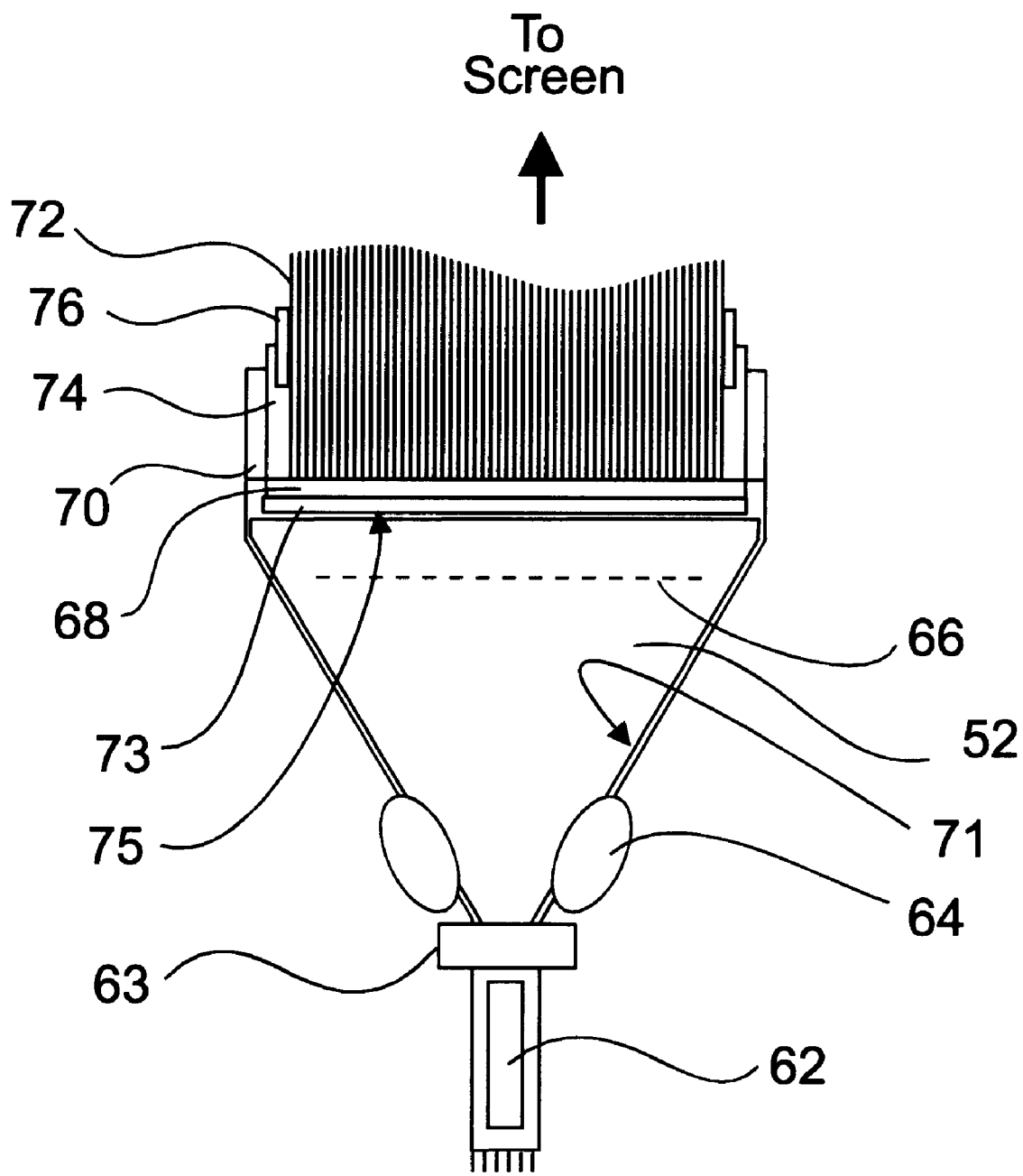
FIG. 6 is a schematic representation of the attachment of optical fibers to the face of a cathode ray tube.

Referring now to FIG. 6, there is shown a detailed schematic representation of CRT 52. CRT 52 comprises a conventional tri-color electron gun 62. In alternate embodiments, electron gun 62 could be implemented as a single electron gun and a beam splitter, a side-by-side (inline) configuration on individual electron guns. There may be other electron gun configurations known in the art which could be employed to satisfy a particular operating requirement. The inside surface of the glass envelope of CRT 52 is metal-coat to form an anode 71. Anode 71 is typically connected to a high-voltage source (not shown) via a connection (not shown) somewhere on the CRT envelope. A conventional magnetic deflection yoke 64 comprising both horizontal and vertical deflection coils (not shown) is shown proximate the neck of CRT 52. Any conventional magnetic or electrostatic deflection strategy well known in the CRT art could be used in alternate embodiments. In addition, an optional magnetic or electrostatic focusing array 63 may be used for enhanced electron beam control when required. A conventional shadow mask 66 is placed between electron gun 62 and the face of CRT 52. The configuration of shadow mask 66 is dependent upon the choice of electron gun 62. If a single electron gun and beam splitter is chosen, shadow mask 66 with have a slotted configuration, otherwise the opening is shadow mask 66 will be essentially circular. The face of CRT 52 may have a florescent light-emitting screen 73 which may include an aluminized mirror coating 75. The luminescent screen 73 is made of a thin layer of phosphors (approximately 3 mg/cm$^2$). The phosphor screen is aluminized by vacuum evaporation from a small molten aluminum pellet. The aluminum layer 75 is approximately 200 nanometers thick. The electron beam penetrates the aluminum film and its energy is transferred primarily to the phosphor screen. The reflection of light by the aluminum mirror increases the picture brightness and improves picture contrast by preventing stray light from illuminating the backside of the phosphor screen. The luminescent screen 75 is for conversion of energy to light. The light is then transmitted down the optic fibers 72 to the optical couplers.

In the preferred embodiment, a plurality of optical fibers 72 are grouped together in an ordered fashion and held in position by collar 76. After polishing, the ends of fiber optic strands 72 are coated with a suitable light-emitting phosphor 68 using methods well known to those skilled in the art. A mechanical mounting assembly 74 holds fibers 72 with collar 76 in place at the face of CRT 52. A seal 70 between mounting assembly 74 and the envelope of CRT 52 maintains the necessary vacuum in CRT 52. In alternate embodiments, a conventional CRT could be adapted to receive optical fibers 72 at it face.

Figure 7A:
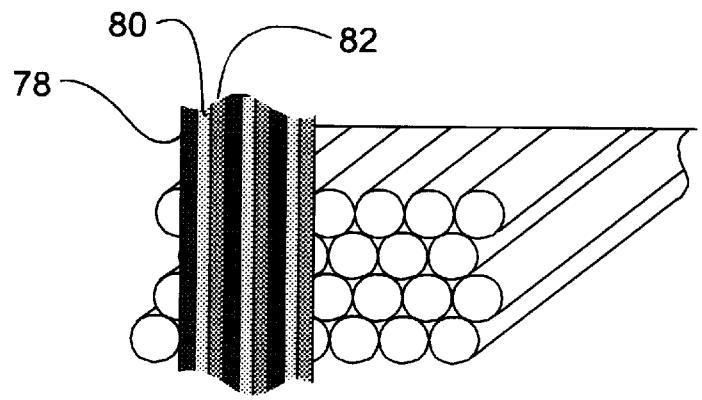
FIG. 7a is an end view of a stacked flatbar assembly showing phosphor coating applied in a first configuration.
Figure 7A:
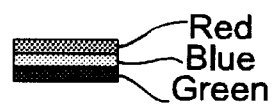

Referring now to FIG. 7a, there is shown an end view of a stacked, optical flatbar assembly with phosphor coating applied. The three phosphors (red-emitting 78, blue-emitting 80, and green-emitting 82) are shown applied to the face of the flatbar assembly in vertical line arrays. In the preferred embodiment, the phosphor stripes are generally 0.6 mm to 0.8 mm in width are separated by thin, opaque black lines (not shown). This configuration of phosphor would generally be used with a single-beam electron gun, a beam splitter and a slotted configuration shadow mask.

Figure 7B:
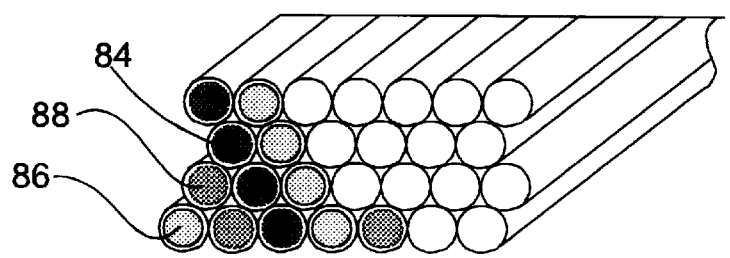
FIG. 7b is an end view of a stacked flatbar assembly showing phosphor coating applied in a second configuration.
Figure 7B:

Referring now to FIG. 7b, there is shown an end view of another stacked, optical flatbar assembly with phosphor coating applied. It this arrangement the three phosphors (red-emitting 84, blue-emitting 86, and green-emitting 88) are shown applied to essentially the complete surface of individual optical fibers in the stacked optical flatbar assembly. This configuration would usually be used with a conventional, tri-gun and a holed shadow mask. Also, this configuration would most often be employed with large screen sizes.

Figure 7C:
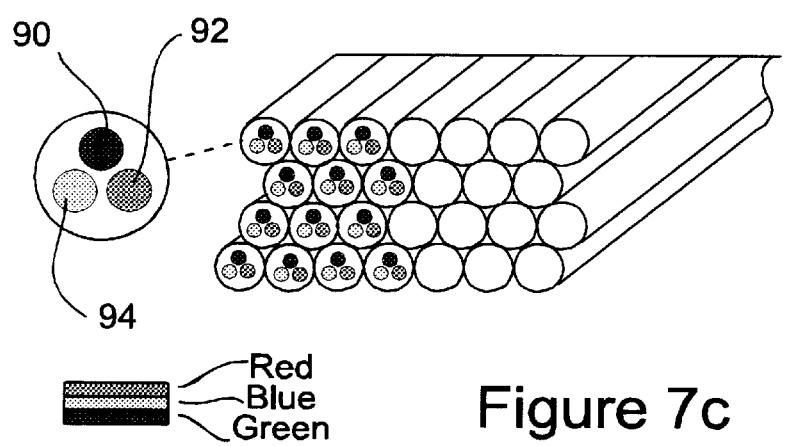
FIG. 7c is an end view of a stacked flatbar assembly showing phosphor applied in a third configuration.
Figure 7C:

Referring now to FIG. 7c, there is shown an end view of a third stacked optical flatbar assembly having red-emitting phosphor 90, blue-emitting phosphor 92 and green-emitting phosphor 94 arranged in individual three-phosphor patterns at the end of each optical fiber. This configuration results in higher resolution and would generally be employed with smaller screen sizes. The configuration would also utilize a tri-gun election gun and a circular-holed shadow mask.

Once assembled (FIG. 5) CRT 52 can be placed in a convenient position relative to screen 40, the positioning limited only by the relative lengths of optical fibers 56. This allows great flexibility in constructing a large-screen display system in a relatively thin cabinet.

Since other modifications and changes varied to fit particular operating requirements and environments will be apparent to those skilled in the art, the invention is not considered limited to the example chosen for purposes of disclosure, and covers all changes and modifications which do not constitute a departure from the true spirit and scope of the invention.

Having thus described the invention, what is desired to be protected by Letters Patent is presented in the subsequent appended claims.

What is claimed is:

1. A fiber optic display screen, comprising:
    a cathode ray tube having a face for emitting visible light in response to an electron beam impinging thereupon, said visible light comprising an image, said face being adapted to receive a predetermined number of optical coupling fibers, each of said fibers having a first end and a second end, said fibers being arranged in a predetermined order such that said image is transferred to said first ends of said optical coupling fibers;
    an optical fiber laminate, said optical fiber laminate having a front surface forming a viewing screen and a rear surface, said optical fiber laminate comprising a matrix of short optical fibers, said short optical fibers being arranged in predetermined groups, each of said groups being adapted to receive at said rear surface a single one of said second ends of said optical coupling fibers and where said predetermined groups of short optical fibers comprise a central fiber surrounded radially by a predetermined number of said short optical fibers; whereby said image from said face of said CRT is transferred to said optical laminate and displayed on said viewing screen.

2. The fiber optic display screen as recited in claim 1, wherein said optical coupling fibers form a portion of the face of said cathode ray tube.

3. The fiber optic display screen as recited in claim 2, wherein said coupling optical fibers further comprise a phosphor, said phosphor emitting visible light in response to an electron beam generated within said cathode ray tube.

4. The fiber optic display screen as recited in claim 3, wherein said phosphor comprises at least two different phosphors, each of said at least two different phosphors being capable of emitting visible light of a unique wavelength in response to an electron beam generated within said cathode ray tube.

5. The fiber optic display screen as recited in claim 4, wherein said at least two different phosphors are applied to an end of said optical coupling fibers.

6. The fiber optic display screen as recited in claim 5, wherein said at least two different phosphors applied to an end of said optical coupling fibers are applied in stripes.

7. The fiber optic display screen as recited in claim 4, wherein said at least two different phosphors applied to an end of said optical coupling fibers are applied in a dot pattern.

8. The fiber optic display screen as recited in claim 7, wherein only one of said at least two different phosphors applied in a dot pattern is applied to a particular optical fiber.

9. The fiber optic display screen as recited in claim 7, wherein more than one of said at least two different phosphors applied in a dot pattern is applied to every optical fiber.

10. The fiber optic display screen as recited in claim 3, further comprising:
   a collar for holding said optical coupling fibers in a predetermined relationship to one another;
   a mounting assembly for attaching said collar and said optical coupling fibers to said cathode ray tube;
   a seal proximate said mounting assembly and said cathode ray tube for maintaining a vacuum in said cathode ray tube.

11. The fiber optic display device as recited in claim 1, wherein said rear surface of at least one of said predetermined groups of said short optical fibers has a concave contour formed therein.

12. The fiber optic display device as recited in claim 11, wherein said second end of at least one of said optical coupling fibers comprises an enlarged, convex portion.

13. The fiber optic display device as recited in claim 12, wherein said enlarged, convex portion is adapted to fit into said concave contour of said at least one of said predetermined groups.

14. The fiber optic display device as recited in claim 13, wherein said concave contour and said enlarged convex portion are each essentially spherical.

15. The fiber optic display device as recited in claim 1, wherein said predetermined number of short optical fibers is six.

16. The fiber optic display screen as recited in claim 1, wherein said optical coupling fibers are affixed to the external surface of said cathode ray tube.

17. A method for constructing a fiber optic display screen, the steps comprising:

assembling a predetermined number of optical fibers into an optical flatbar assembly;

stacking a predetermined number of optical flatbar assemblies into an optical laminate;

cutting a predetermined length from an optical laminate;

polishing both ends of a cut length of optical fiber laminate;

grinding a concave depression into predetermined groups of optical fibers comprising a cut length of optical fiber laminate;

attaching an output end of a single coupling optical fiber to each of predetermined groups of optical fibers comprising said cut length of fiber optical laminate;

attaching a corresponding input end of each of said optical coupling fibers in a predetermined arrangement to an image source.

* * * * *